(12) United States Patent
Trollope et al.

(10) Patent No.: US 9,491,517 B2
(45) Date of Patent: Nov. 8, 2016

(54) SYSTEMS AND METHODS FOR BROADCAST AUDIENCE INTERACTION AND PARTICIPATION

(71) Applicant: Google Inc., Mountain View, CA (US)

(72) Inventors: Ingrid McAulay Trollope, London (GB); Ant Oztaskent, Sutton (GB); Yaroslav Volovich, Cambridge (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/636,943

(22) Filed: Mar. 3, 2015

(65) Prior Publication Data
US 2016/0261917 A1    Sep. 8, 2016

(51) Int. Cl.
| | |
|---|---|
| *H04H 60/33* | (2008.01) |
| *H04N 21/475* | (2011.01) |
| *G10L 19/018* | (2013.01) |
| *G10L 25/51* | (2013.01) |
| *H04N 21/422* | (2011.01) |
| *H04N 21/41* | (2011.01) |
| *H04N 21/442* | (2011.01) |
| *H04N 21/439* | (2011.01) |
| *H04N 21/8358* | (2011.01) |
| *H04N 21/8352* | (2011.01) |

(52) U.S. Cl.
CPC ........... *H04N 21/475* (2013.01); *G10L 19/018* (2013.01); *G10L 25/51* (2013.01); *H04N 21/4126* (2013.01); *H04N 21/42203* (2013.01); *H04N 21/4394* (2013.01); *H04N 21/44218* (2013.01); *H04N 21/8352* (2013.01); *H04N 21/8358* (2013.01)

(58) Field of Classification Search
USPC .............................................. 725/10, 18–19
See application file for complete search history.

(56) References Cited

U.S. PATENT DOCUMENTS

| | | | |
|---|---|---|---|
| 5,726,701 A | 3/1998 | Needham | |
| 2006/0068818 A1 | 3/2006 | Leitersdorf et al. | |
| 2007/0033625 A1 | 2/2007 | Chiu | |
| 2008/0282286 A1 | 11/2008 | Or | |
| 2010/0153189 A1 | 6/2010 | Dudley et al. | |
| 2011/0219394 A1 | 9/2011 | Lueth et al. | |
| 2011/0238753 A1 | 9/2011 | Lueth et al. | |
| 2012/0072939 A1* | 3/2012 | Crenshaw | H04H 60/33 725/12 |
| 2014/0137142 A1* | 5/2014 | Yeh | H04N 21/44218 725/10 |
| 2015/0106854 A1* | 4/2015 | Fabian-Isaacs | H04N 21/439 725/52 |
| 2015/0319491 A1* | 11/2015 | Nielsen | H04N 21/4394 725/14 |

* cited by examiner

*Primary Examiner* — Hunter B Lonsberry
(74) *Attorney, Agent, or Firm* — Foley & Lardner LLP; John D. Lanza

(57) ABSTRACT

A broadcast audience interaction and feedback system may discover and activate a recording function of a portable device of a user to record audio and/or video of media content output by a media device in proximity to the user. The audio or video data may be used to identify the content by matching audio or video fingerprints or signatures of the data recorded by the portable device with separately generated signatures or fingerprints associated with the content. Additional entities may be automatically associated with the content via capturing of metadata or closed captioning data during the content, OCR of displayed text in the content, or detection of other such entities. In some implementations, the portable device may also capture feedback from the user, including cheering, applause, and laughter, as well as explicit questions or comments, voting choices, etc. The feedback may be identified, and queries generated or additional functions performed based on the identified feedback, the identified media content, and/or one or more entities associated with the identified media content.

20 Claims, 7 Drawing Sheets

SYSTEMS AND METHODS FOR BROADCAST AUDIENCE INTERACTION AND PARTICIPATION

BACKGROUND

Television audience participation systems allow viewers to provide feedback or vote via short message service (SMS) text messaging, calls to dedicated telephone numbers, or via dedicated buttons on a remote control. However, these systems typically either require multiple steps by the viewer, such as navigating a voice menu system by telephone; or utilize complex hardware that may be unintuitive for the user. Furthermore, many such systems require users to remember instructions or phone numbers displayed on the screen for short periods of time or send specific codes that may be difficult to remember. Newer systems attempt to overcome these deficiencies with smartphone applications; however, different apps may exist for each broadcaster, content provider, or show, with different methods of interaction, increasing confusion and user frustration.

SUMMARY

The present disclosure is directed to systems and methods for using standard audio queries in a content matching or audience feedback system, with audio received by a user's computing device (e.g. tablet, smartphone, laptop, wearable computer, etc.) or by a dedicated device (e.g. set-top box, smart television). The audio may be used to identify content output by a display device to a user by listening to watermarks, providing audio fingerprints to a content matching service, etc. In other implementations, a set top box or smart television may monitor metadata, closed captioning, or OCR of displayed text to identify a displayed program. The same microphone of the user's device may be used to monitor feedback from the user, including cheering, applause, and laughter, as well as explicit questions or comments, voting choices, etc. In some implementations, the user's device may be automatically discovered in response to broadcast requests from the set top box or smart television, and may enter into an always-listening mode responsive to determining that the viewer is watching television. In other implementations, the user's device may be activated by a user interaction or query, and in response, begin content matching.

Audio may be obtained from user devices responsive to the user consenting or "opting in" to the collection or feedback system. In some implementations, users may be panel members, such as users that have joined a single source measurement panel or audience measurement panel. Audio capture may also be temporarily paused or permanently disabled by the user, or the user may withdraw consent and cease participating in the feedback system at any time. Audio capture or information about the audio may also be anonymized or made ambiguous, stripped or cleaned of any personally identifying information, and/or encrypted for transmission.

In some implementations, viewer interaction may be recorded, measured, and/or rebroadcast to provide gamification features or user-generated content. In one such implementation, via the same system, a program may encourage viewers to sing along to a song to be entered into a drawing to receive concert tickets. Recorded clips may be provided to the content provider for rebroadcast to other viewers. In another implementation, viewers may easily mark broadcast or displayed content for purchase or subsequent search, such as products displayed or background music played during a program segment.

One implementation disclosed herein is a method for broadcast audience interaction. The method includes broadcasting, by a first device associated with a media output device to a portable device, a discovery signal, receipt of the discovery signal causing the portable device to activate a microphone of the portable device. The method also includes receiving, by the first device, a segment of audio output by the media output device and an audio interaction of a user recorded by the microphone of the portable device. The method further includes determining, by the first device, that the audio interaction of the user is not output by the media output device. The method also includes generating, by the first device, a first identifier of the audio interaction of the user and a second identifier of the segment of audio output by the media device; and transmitting, by the first device to a measurement system, the first identifier and the second identifier, the measurement system recording an identification of an item of content corresponding to the segment of audio output by the media device and an interaction with the item of content.

In some implementations of the method, the received segment of audio output is recorded by the first device and the microphone of the portable device; and determining that the audio interaction of the user is not output by the media output device further comprises subtracting the segment of audio output recorded by the first device from the audio interaction of the user to generate an isolated audio interaction of the user. In other implementations, determining that the audio interaction of the user is not output by the media output device further comprises identifying a high correlation between a prior segment of audio output by the media output device and audio recorded by the microphone of the portable device, and a lower correlation between the segment of audio output by the media output device and the audio interaction of the user. In still other implementations, transmitting the first identifier and the second identifier to the measurement system further causes the measurement system to compare the first identifier to a plurality of identifiers of items of content; and the measurement system records the identification of the item of content corresponding to the segment of audio output by the media device responsive to the comparison.

In another aspect, the present disclosure is directed to a method for broadcast audience interaction. The method includes receiving, by a portable device, a discovery signal broadcast by a second device associated with a media output device. The method also includes activating a microphone of the portable device, by the device, responsive to reception of the discovery signal. The method further includes recording a segment of audio output by the media output device and an audio interaction by a user, via the microphone, by the portable device. The method also includes transmitting an identification of the recorded segment of audio and the recorded audio interaction, by the portable device to the second device. The second device distinguishes the recorded segment of audio from the recorded audio interaction.

In some implementations, the method includes transmitting a device identifier, by the portable device to the second device, responsive to receiving the discovery signal. In other implementations, the method includes generating a fingerprint of the recorded segment of audio; and transmitting the identification of the recorded segment of audio further comprises transmitting the fingerprint of the recorded segment of audio. In still other implementations, the method includes generating a fingerprint of the recorded audio interaction; and transmitting the identification of the recorded audio interaction further comprises transmitting the fingerprint of the recorded audio interaction. In yet still other implementations, the identification of the recorded segment of audio and the recorded audio interaction are provided to a feedback system configured to associate an identification of the interaction with an item of media content associated with the recorded segment of audio.

In still another aspect, the present disclosure is directed to a system for broadcast audience interaction. The system includes a first receiver at a measurement location, configured for receiving an item of media. The system also includes a fingerprint generator, configured for generating a first fingerprint from the received item of media. The system further includes a correlation engine executed a processor of a device, the correlation engine configured for receiving a second fingerprint generated from a segment of the item of media recorded from a media output device by a client device at a client location, and identifying a correlation between the first fingerprint and the second fingerprint. The system also includes a feedback engine executed by the processor, configured for receiving a recording of feedback of an audience member by the client device, and associating the feedback with the item of media responsive to the identified correlation between the first fingerprint and the second fingerprint.

In some implementations, the correlation engine is further configured for comparing the second fingerprint with a plurality of fingerprints generated by the fingerprint generator. In a further implementation, the correlation engine is further configured for identifying the correlation between the first fingerprint and the second fingerprint, responsive to the correlation between the first fingerprint and the second fingerprint exceeding a correlation between the second fingerprint and any other fingerprints of the plurality of fingerprints.

In other implementations, the correlation engine is further configured for generating a confidence score of the correlation between the first fingerprint and the second fingerprint. In a further implementation, the correlation engine is further configured for increasing the confidence score, responsive to an identification of a correlation between a third fingerprint generated by the fingerprint generator from the received item of media prior or subsequent to the first fingerprint, and a fourth fingerprint generated from a corresponding prior or subsequent segment of the item of media recorded from the media output device by the client device.

In still other implementations, the feedback engine is further configured for associating the feedback with an entity associated with the item of media in an entity database. In a further implementation, the system includes an entity detector configured to generate the association of the entity and the item of media responsive to detection of the entity in the segment of the received item of media. In another further implementation, the feedback engine is further configured to transmit a query to a search provider comprising an identification of the entity and an identification of the feedback. In a yet still further implementation, the query further comprises a device identifier of the client device. In a still yet further implementation, receipt of the query by the search provider causes the search provider to transmit a response to the client device comprising the identification of the entity. In other implementations, the feedback engine is further configured to determine, responsive to a comparison of the recording of feedback to one or more predetermined feedback signatures, whether the feedback is positive or negative; and to transmit a corresponding positive or negative feedback indicator to a content provider.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
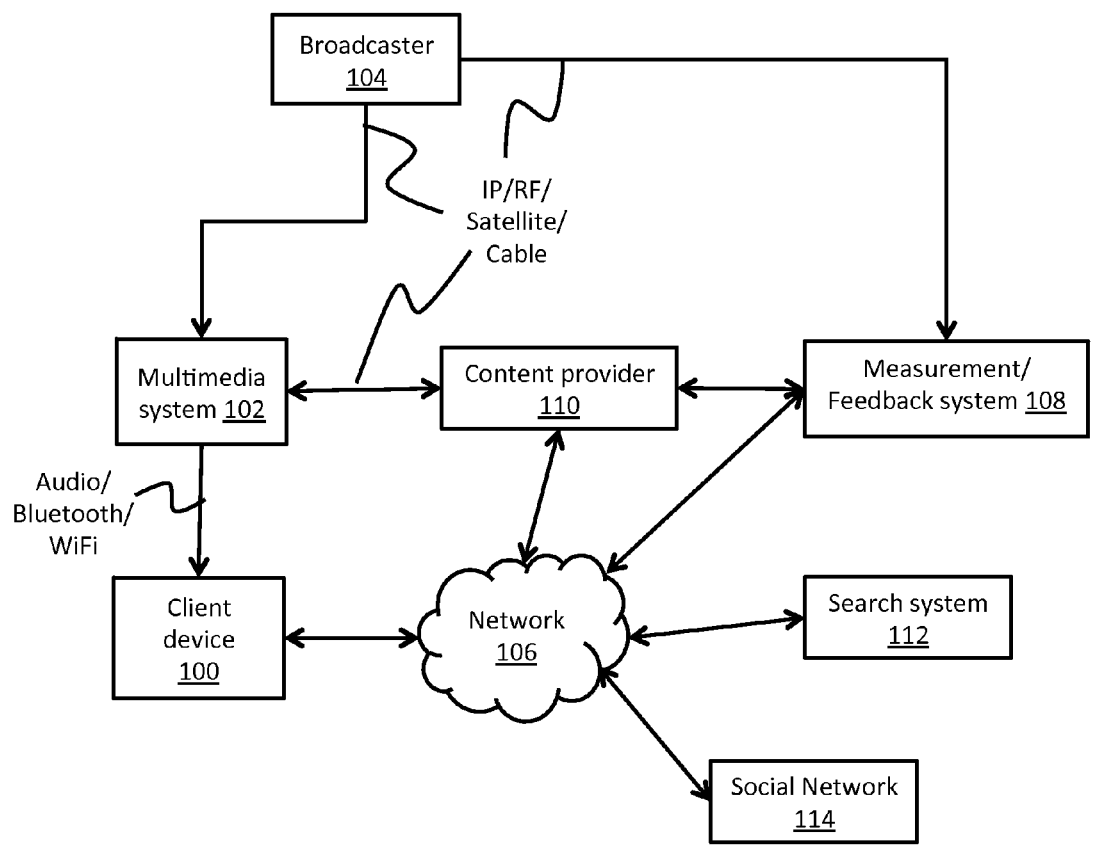
FIG. 1 is a diagram of a system for broadcast audience interaction and participation, according to one implementation.

The systems and methods described herein provide an intuitive, yet highly interactive experience for audience members of a broadcast, allowing them to engage with and provide feedback for broadcast content at their convenience in a natural way. An input device, such as a microphone or camera, may detect feedback or an interaction of an audience member of the broadcast. In some implementations, the input device may be a microphone or camera of a smart phone, tablet, or other portable or wearable device of the audience member. In one implementation, the input device may be activated to detect feedback or interactions manually by the audience member, such as via a button, gesture, or spoken code; while in another implementation, the input device may be activated to detect feedback or interactions automatically via a broadcast discovery or activation signal transmitted by a second device associated with a media output device, such as a set-top box, smart television, cable or satellite receiver, home theater system, router or WiFi gateway, or any other such device.

In one implementation, audio received by a microphone, such as a microphone of a portable device of the audience member, may be used to identify content output by a media output device (e.g. television, radio, computer, etc.) by recording audible or sub-audible watermarks, tones or other data, and generating audio fingerprints or providing the recordings to a content matching service. In other implementations, a media device, such as set top box or smart television, may monitor metadata, closed captioning, or OCR of displayed text to identify a displayed program. The microphone and/or camera of the audience member's device, or a microphone and/or camera of the media device, may be used to monitor feedback on or interactions with the broadcast content from the audience member. In some implementations, feedback may include verbal or non-verbal responses to content of a broadcast, including cheering, clapping, laughing, booing, singing along, or other such responses. In other implementations, feedback may include interactions such as voting, commenting, or expressing spoken opinions, which may be helpful for competition or game shows, political debates, sports events, live music performances, etc. In still other implementations, audience member interactions may include queries, such as requests for information about the broadcast content, songs played within the content, or people or products appearing in the content. In yet still other implementations, audience member interactions may include commands, such as commands to share the identified content with a friend or other identified user.

In some implementations, viewer interaction may be recorded, measured, and/or rebroadcast to provide gamification features or user-generated content. In one such implementation, via the systems discussed herein, a program may encourage viewers to sing along to a song to be entered into a drawing to receive concert tickets. Recorded clips may be provided to the content provider for rebroadcast to other viewers. In another implementation, viewers may easily mark broadcast or displayed content for purchase or subsequent search, such as products displayed or background music played during a program segment.

FIG. 1 is a diagram of a system for broadcast audience interaction and participation, according to one implementation. A client device 100, such as a portable device, wearable device, laptop device, desktop device, or other such device, may record segments of content output by a multimedia system 102, which may include a display, speaker, or other such output device. The client device 100 may receive audio or video of the content via a microphone and/or camera. In some implementations, the client device 100 may receive metadata or information about the content embedded in an audio or video signal received via the microphone and/or camera, or via wireless transmissions received by an antenna of the client device, such as Bluetooth, Near Field Communications (NFC), WiFi, or other such transmission methods. The content may be provided to the multimedia system 102 by a broadcaster 104 or other content provider 110. Said content may be provided via any broadcast, unicast, or multicast system, including satellite or terrestrial transmission, network transmission via a Wide Area Network (WAN) such as the Internet, cable transmission, or other such system.

In some implementations, a client device 100 may generate fingerprints or identifiers of recorded segments of content, and may provide the fingerprints or identifiers to a measurement/feedback system 108 for identification via a network 106. In other implementations, a client device 100 may transmit the recorded segments of content to a measurement/feedback system 108 via network 106, which may generate the fingerprints or identifiers. The measurement/feedback system 108 may also receive broadcast content or fingerprints or identifiers from a broadcaster 104 or content provider 110, or via one or more local capture devices, discussed in more detail below. The measurement/feedback system 108 may compare fingerprints or recorded segments from the client device 100 to fingerprints or recorded segments from the broadcaster 104 or content provider 110 and identify, based on a match or statistical correlation between fingerprints, that the multimedia system 102 was outputting an identified item of content or broadcast program.

Additionally, the client device 100 may also record interactions or feedback from an audience members, such as verbal queries, commands, or comments, or non-verbal feedback such as cheers or applause. Measurement/feedback system 108 may similarly receive the interactions or feedback, or generated fingerprints of the interactions or feedback. The measurement/feedback system 108 may compare the received interactions or feedback or generated fingerprints to a database of other interactions or fingerprints to identify, based on a match or statistical correlation, the type of query, command, or other interaction. The corresponding query or command may be performed on the identified item of content or broadcast program, or an identification of the feedback may be provided to the broadcaster or content provider for audience analysis and content programming decisions, or for inclusion within the broadcast. In some implementations, the measurement/feedback system 108 may transmit a query or command based on the audience member's interaction and the identified item of content to a search system 112 or a social network provider 114, providing the audience member with easy access to additional information and/or sharing or commenting services.

Figure 2A:
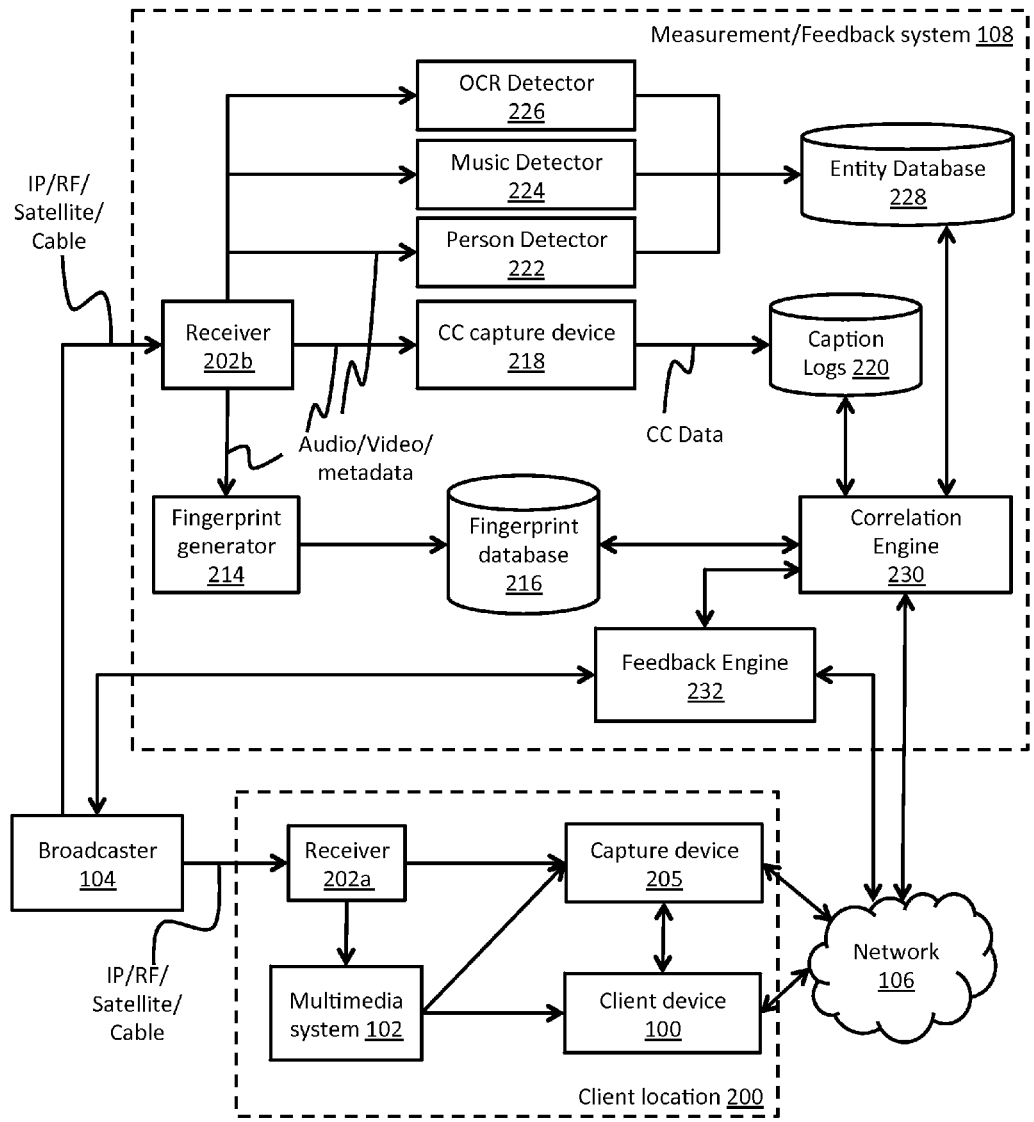
FIG. 2A is a block diagram of a system for broadcast audience interaction and participation, according to one implementation.

FIG. 2A is a block diagram of a system for broadcast audience interaction and participation, according to one implementation. As shown, a broadcaster 104 may deliver content to client systems at a client location 200 (e.g. home, living room, hotel room, office, or any other place where an audience member or client may be present to receive media output by a multimedia system 102) via satellite or terrestrial radio frequency (RF) broadcasts, cable systems, or via Internet protocols (IP) such as streamed or downloaded content, VOD systems, or other such systems. Although shown as a single entity, in many instances, a broadcaster 104 may comprise a broadcast source such as a national broadcast network source, a regional or local network affiliate that receives and redistributes the network source (sometimes with additional local or regional-specific content), a cable broadcast provider, an Internet service provider (ISP), or other various affiliated and non-affiliated entities.

Content may be received by a client system at a receiver 202a, which may comprise an antenna or satellite dish and demodulator or decoder, a cable receiver, a digital television (DTV) decoder, a set top box, a DVR, a computing device, or any other type and form of device for receiving content with closed captioning data. The receiver 202a may be connected to a multimedia system 102, such as a television, home theater system, or any other type and form of device for displaying audio and/or video content received and decoded by a receiver 202a. In some implementations, the receiver 202a and multimedia system 102 may be combined, as in many televisions with attached antennas or included cable demodulators, "smart" or Internet-attached televisions, or other such devices.

A user at a client location 200 may carry or have nearby a client device 100. Client device 100 may be a desktop computer, laptop computer, tablet computer, smart phone, wearable computing device, entertainment or video game console, smart television, set top box, or any other type and form of device. In some implementations, client device 100 may include a microphone, video camera, touch screen, keyboard, or other input device to receive user feedback and/or interactions. Interactions may include queries or requests for information to a search system, via a network 106; commands to a social network provider; or other feedback provided via a feedback system 108 to a broadcaster 104 or other content provider. In some implementations, client device 100 may also record segments of audio or video content output by the multimedia system 102 or embedded watermarks within audio or video content output by the multimedia system 102, including audible or subaudible tones or data bursts. In some implementations, client device 100 may receive metadata of content from a multimedia system 102 or receiver 202a, such as via a Bluetooth, WiFi, NFC, or other such communication method.

In some implementations, client location 200 may also include a capture device 205, which may be separate from or integrated within a receiver 202a and/or multimedia system 102. Capture device 205 may include audio or video inputs for receiving content from receiver 202a and/or multimedia system 102 and for capturing segments of audio or video content, metadata, closed captioning data, or any other such data, including data in vertical or horizontal blanking intervals, digital packet headers, or any other form. In some implementations, capture device 205 may communicate via a network interface, including a wired or wireless interface, with receiver 202a and/or multimedia system 102. Capture device 205 may be used to identify content output by multimedia system 102, or may capture data for transmission to a measurement system for identification. In some implementations, capture device 205 may also include a microphone, video camera, or other input device for detecting feedback or interactions of an audience member.

In some implementations, a receiver 202a, multimedia system 102, or capture device 205 may include a broadcast transmitter for broadcasting an identification or discovery signal. The signal may be received by a client device 100 and trigger activation of a microphone, camera, or other input device when the client device 100 is in the client location 200 (and accordingly when the audience member is present to receive content output by the multimedia system 102). In some implementations, the signal may be a WiFi, Bluetooth, NFC, or similar RF signal. In other implementations, the signal may be an audible or subaudible tone, noise burst, recorded audio, or similar data. In still other implementations, the signal may be an infrared (IR) or an optical signal. In other implementations, input devices of the client device 100 may be activated by the audience member via an input device, such as via a gesture, button, or spoken command or query (e.g. "allow me to participate", "what is this show?", or "share this television program with my friend"). As discussed in more detail below, the device may interpret the command or query, and record segments of audio or video in order to identify the content output by the multimedia system 102 and fulfill the request or perform the commanded action.

Client device 100 and/or capture device 205 may communicate via a network 106 with a measurement/feedback system 108, search providers, social network providers, content providers, or other such services. Network 106 may be any form of computer network or combinations of networks that relay information between one or more client devices 100, a measurement/feedback system 108, and one or more other devices and systems not illustrated (e.g. web sites, Internet service providers, cable providers, etc.). Network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections, such that a client device 100 may communicate wirelessly (e.g., via WiFi, cellular, radio, etc.) with a transceiver that is hardwired (e.g., via a fiber optic cable, a CAT5 cable, etc.) to other computing devices in network 106. In some implementations, a network 106 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.).

Measurement/feedback system 108, sometimes referred to as an audience measurement system, an audience feedback system, or by other similar terms, may include one or more computing devices, storage devices, capture devices, receivers, or other such devices. A measurement/feedback system 108 may be centralized or distributed. In many implementations, a measurement system may include a plurality of receivers deployed in different geographic or broadcast markets to receive and identify local programming. Measurement system 108 also receive content streams from a broadcaster 104 or other content providers, or other such identifications of content (e.g. program guides or listings, broadcast logs, etc.). In some implementations, a measurement system may include a receiver 202b, which may be similar to a receiver 202a at a client location 200. Receiver 202b may receive content from a broadcaster 104 via terrestrial or satellite broadcast, cable system, Internet, or any other such means, and may output video to a measurement service fingerprint generator 214, a closed captioning (CC) capture device 218, an optical character recognition (OCR) detector 226, a music detector 224, a person detector 222, or other such devices. In some implementations, a receiver 202b may be in the same geographical region as a receiver 202a. As discussed above, in one such implementation, at least one receiver 202b may be deployed in major cities or broadcast markets to capture the broadcasts from a local broadcaster 104. In other implementations, a receiver 202b may be deployed elsewhere, and may receive a similar, but different broadcast. A receiver 202b may receive a national network broadcast via a cable system, while a receiver 202a may receive a terrestrial broadcast from a local affiliate of the national network broadcaster. Such local affiliate broadcasts may include similar content, but may have different interstitial advertising, local newscasts, or other inserted or modified content. Although only one receiver 202b is illustrated, in some implementations, a plurality of receivers 202b may be deployed at a location; e.g. one per broadcaster to be measured. In other implementations, a receiver 202b may have a plurality of tuners, demodulators, or sub-receivers and may be able to receive and output a plurality of broadcasts simultaneously to a corresponding plurality of measurement service capture devices and detectors 218-226 and/or fingerprint generators 114.

Federal Communications Commission (FCC) regulations require all United States broadcasters to provide closed captioning for television programs. In analog television broadcasts compliant with National Television System Committee (NTSC) standards, closed captioning is encoded into line 21 of the vertical blanking interval in EIA-608 format, developed by the Electronic Industries Alliance (EIA), and frequently referred to as "line 21 captioning". For digital television broadcasts compliant with Advanced Television System Committee (ATSC) standards, closed captioning is provided via three encoded streams, two of which provide backward compatibility with NTSC decoders, the third providing up to 63 additional captioning streams encoded in EIA-708 format (sometimes referred to as "CEA-708" format). As the closed captioning is content-specific, the encoded text may be used to identify specific programs being watched by a viewer, and accordingly may be used for audience measurement via the systems and methods disclosed herein. Because each broadcaster already is generating and embedding the captioning, these systems and methods do not require any additional encoders to be installed at stations or cable providers. Many other countries require similar embedding of close captioning or subtitle data, or closed captioning may be provided by a private entity, that may be used in a similar fashion (e.g. subtitle requirements promulgated by the Office of Communications (Ofcom) in the United Kingdom; Red Bee Media in Australia; etc.).

A CC capture device 218 may receive the NTSC/ATSC/DVB and/or ISDB video signal from a receiver 202b (e.g. cable or HDTV decoder, set top box, digital video recorder (DVR), receiver, television output, or other such source). The CC capture device 218 may decode the closed captioning signal (e.g. the encoded line 21 signal and/or embedded EIA-708 streams), for generation of a database of closed captioning text 220. The database may be populated via one or more CC capture devices 218 receiving local or national broadcast signals, or with data separately provided by broadcasters (e.g. metadata, text files, ancillary data, or other such transmissions).

Although shown grouped in a measurement system, in some implementations, a receiver 202b need not be located in geographic proximity to a fingerprint generator 214, capture device 218, or detector 222-226 and/or correlation or feedback engines 230-232. In such implementations, a receiver 202b may communicate with a fingerprint generator 214, capture device 218, or detector 222-226 via a network 106, such as the Internet; and/or a fingerprint generator 214, capture device 218, or detector 222-226 may communicate via a network 106 with an measurement/feedback system. In one implementation, a receiver 202b and/or fingerprint generator 214, capture device 218, or detector 222-226 may be deployed at a broadcast transmission site or studio and receive a pre-transmitter video feed or a feed from a monitoring receiver at the site or studio, and may transmit decoded closed captioning data or logs 220 to a correlation engine 230 via a network 106.

As discussed above, in some implementations, a measurement system may include a database or storage device storing closed captioning data, referred to generally as a caption logs 220. Closed captioning data for the database 220 may be received from the CC capture device 118, or may be received directly from a broadcaster 104. In one implementation, closed captioning data may be intercepted before encoding in the video signal and/or decoded via a monitoring output at a broadcast site or studio, and may be transmitted via a network 106 for storage in a closed captioning database 220. In a similar implementation, closed captioning data may be provided in non-real-time from the broadcaster 104 for inclusion in a closed captioning database 220. In one implementation, the broadcaster 104 may separately provide text or data files of closed captioning data to be embedded in a video signal during broadcast of a movie or television program, sometimes hours, days, or weeks in advance of broadcast. Similarly, the broadcaster 104 may provide text or data files of closed captioning data for one or more items of content in a VOD library.

Although shown separate from correlation engine 230, in many implementations, closed captioning data 220 may be part of the correlation engine 230 or maintained by the correlation engine 230. Accordingly, in such implementations, the correlation engine 230 may receive closed captioning data from broadcaster(s) 208 and/or fingerprint generator 214, capture device 218, or detector 222-226 and may store the data in the closed captioning database 220.

Closed captioning database 220 may comprise a relational database, flat file, data file, or any other type and form of database. In some implementations, closed captioning text may be stored in the database 220 as text. In other implementations, a portion of closed captioning text (e.g. a number of words or characters, such as 5 words, 8 words, 10 words, 50 words, or any other such value; an amount of data in a number of video fields, such as closed captioning data from one video field, 10 video fields, or any other such value; or an amount of data within a predetermined period of time, such as closed captioning data embedded within 5 seconds of video, 10 seconds of video, or any other such value) may be hashed or used as an input to a hashing algorithm, with the result entered into the database or used as an index to an entry in the database. Closed captioning database 220 may also include an identification of an item of content associated with the closed captioning data or portion of the closed captioning data. In implementations in which closed captioning data is received in non-real-time from a broadcaster, the data may be explicitly identified as associated with an item of content. In other implementations in which closed captioning data is received via a receiver 202b and decoded by a measurement service capture device 220, the data may be associated with an item of content based on a broadcast schedule, embedded metadata, or other such information. In still other implementations, the data may be associated with a channel and broadcast time that the content was received by a receiver 202b, and may be subsequently associated with the item of content based on a broadcast schedule, such as during a subsequent step of audience measurement.

An audience measurement system 218 may also include one or more fingerprint generators 214. Fingerprint generators 214 may include hardware and/or software for identifying items of content and/or advertising provided by a broadcaster 104 as part of a broadcast content stream. In some implementations, fingerprint generators 214 may generate audio and/or video fingerprints of content items by sampling audio and/or video data of the content items and calculating a hash of the resulting audio and/or video data, by decimating the audio and/or video data (e.g. by removing nine out of ten samples) and hashing the decimated data, by calculating a convolution of the audio data against the video data, or otherwise creating a unique identifier for an item of content. Fingerprints may be stored in a fingerprint database 216 and compared against other fingerprints, to identify if a content item was previously provided in the same or a different broadcast stream. The same advertisement may be provided by a broadcaster 104 on multiple channels at different times, or a popular song may be played on multiple radio stations in a market at different times. Fingerprinting the audio and/or video of such content may allow aggregated measurements of audience of the content, as well as disambiguating search spikes to different instances of broadcast of the content. In some implementations, fingerprints for content, such as advertisements, may be pre-generated or added to a fingerprint database 216. The fingerprint generator 214 may receive incoming audio or video and compare a fingerprint generated for the audio or video to fingerprints in the database 216. A match may allow the measurement system 108 to recognize that a specific item of known content, such as an advertisement, is being broadcast. The measurement system 108 may add an identification to a database 228 to indicate that the known content was broadcast on a specified channel at a specified time.

As discussed above, in many implementations, a client device 100 or capture device 205 may generate fingerprints from recorded audio or video. Accordingly, in such implementations, client device 100 or capture device 205 may include a fingerprint generator 214. In other implementations, client device 100 or capture device 205 may record audio or video segments, and transmit the segments via a network 106 to another device, such as measurement system 108 for processing by a fingerprint generator 214.

Measurement/feedback system 108 may also include a person detector 222. Person detector 222 may be a server, service, daemon, application, routine, or other executable logic for receiving and decoding frames of video and/or still images, and detecting and/or identifying a person present within the image. In some implementations, person detector 222 may include a facial recognition system to identify and isolate regions of an image including a face (e.g. via principal component analysis (PCA) using eigenfaces, linear discriminate analysis (LDA), or any other such methods). In some implementations, the person detector 222 may identify a face within an image and provide a subset of the image including the face to a search provider or social networking system for matching to one or more similar images of an individual and/or identify the individual. In other implementations, the person detector 222 may compare an identified face to a set of images of faces identified as included in media content. A broadcaster 104 or content provider may include metadata with a broadcast, or measurement system 108 may identify, via CC capture device 218 or OCR detector 226, text displayed in or transmitted with video including names of individuals (e.g. actors, participants, etc.). Person detector 222 may retrieve images of the individuals from a search provider or social network site and may compare identified faces in the video to the retrieved images. Utilizing such a priori knowledge may be significantly faster than searches that lack context.

Measurement/feedback system 108 may also include a music detector 224. Music detector 224 may be a server, service, daemon, application, routine, or other executable logic for receiving and isolating segments of audio, and detecting and/or identifying a song. In some implementations, music detector 224 may be similar to a fingerprint generator 214 and search a database of music fingerprints to identify a match, indicating a particular song was played. In a further implementation, music detector 224 may use a priori knowledge from closed captioning or text identified by CC capture device 218 or OCR detector 226 or metadata received from a broadcaster or content provider to identify a song or a set of likely songs to expedite match detection (e.g. album or artist identifications). In a similar implementation, music detector 224 may detect indicators within OCR or CC data indicating music is playing (e.g. musical note symbols in closed captioning, text such as "music playing", etc.) In another implementation, music detector 224 may include one or more filters and/or detectors to identify segments including music within an audio stream. In one such implementation, an audio signal may be low pass filtered to isolate low frequency signals, and a sliding window algorithm may be used to detect periodic signals that may indicate drums or bass notes. Responsive to the presence of such periodic signals, a fingerprint of the audio stream may be generated and compared to a database; conversely, if periodic signals are absent, then the detector may assume that no music is being played. In other implementations, music detector 224 may use statistical analysis to identify features within audio common to music, such as interchannel differences indicating stereo distribution, periodic signals, harmonically-related tones, distributions of high and low frequency signals beyond a vocal range, etc. If such analysis indicates a likelihood of music above a threshold, then in such implementations, music detector 224 may generate a fingerprint and compare the fingerprint to a music database. In other implementations, music detector 224 may simply compare received audio signals and/or fingerprints to a music database, without performing further detection, filtering, or analysis.

Measurement/feedback system 108 may also include an OCR detector 226. OCR detector 226, sometimes referred to as a "screen scraper", may be a server, service, daemon, application, routine, or other executable logic for receiving and decoding frames of video and/or still images, and detecting and/or identifying text present within an image. OCR detector 226 may scan regions with various sliding windows or block detection sizes to identify alphanumeric characters or other predefined symbols. In some implementations, OCR detector 226 may provide identified text to detectors 222-224 to aid in identifying individuals or music.

Upon detecting and/or identifying a person, song, or text, the person detector 222, music detector 224, or OCR detector 226 may store an identification of the identified element or entity in an entity database 228. Entity database 228 may be a database, flat file, index, relational database, or any other type and form of data structure for storing an identification of an entity (e.g. person, song, text, keyword, album, artist, etc.) identified by a detector 222-226, along with, in some implementations, a timestamp including day, time, time zone, or any other such information; a broadcast or content source; and/or metadata about the broadcast or content source (e.g. channel, uniform resource locator (URL), internet protocol (IP) address, file name, show name, type, genre, producer, publisher, etc.). Entity database 228 may accordingly store identifications of when entities were displayed or played during a broadcast, along with additional identifiers such that the measurement/feedback system 108 may determine, upon receipt of an identification of an identical entity from a client device 100 or capture device 205, that a multimedia system 102 likely received the same broadcast. Entities may also be related to each other by time and broadcast source, such as entities included in the same broadcast (e.g. two actors in a scene; a singer shown performing a song; a product name and a celebrity spokesperson; etc.). Accordingly, if an audience member requests information on an entity in a broadcast, such as an actor's filmography, the broadcast may be identified via fingerprints of content received by the audience member's client device 100 and/or capture device 205; the measurement/feedback system 108 may retrieve from the entity database 228 an identification of an actor associated with the broadcast and with a timestamp equal to or shortly prior to the query; and the measurement/feedback system 108 may direct a search provider to transmit the requested information to the client device 100 based on the retrieved identification.

A measurement/feedback system 108 may include one or more correlation engines 230. A correlation engine 230 may be an application, service, server daemon, or other executable logic for comparing and correlating fingerprints, watermarks, metadata, timestamps, received audio or video, or any other such data from a client device 100 or capture device 205, with fingerprints, watermarks, metadata, timestamps, received audio or video, or any other such data from a fingerprint generator 214, CC capture device 218, or detector 226, said latter data associated with a broadcast source and time. A correlation engine 230 may thus identify, based on the correlation between the received client data and measurement system-generated data, an item of media content output by the multimedia system 102 and detected by the client or capture devices 100, 205 at a particular time, indicating that an audience member associated with device 100, 205 was likely present and receiving the media content.

A correlation engine 230 may include one or more computing devices, servers, desktop computers, rack mount computers, workstations, or other devices. In some embodiments, a correlation engine 230 may be a virtual machine or machines executed by one or more physical machines, such as in a cloud service or server farm. Correlation engines 230 may be located in proximity to measurement service capture devices, detectors, and receivers, or may be remote from the devices and may communicate with the devices over a network 106.

A correlation engine 230 may compare a fingerprint of recorded audio or video from a client device or capture device (referred to generally as a client fingerprint) with one or more fingerprints in database 216 (referred to generally as a measurement fingerprint) to identify a match. In one implementation, upon receipt of a client fingerprint and timestamp from a client device or capture device, or upon generating a client fingerprint from audio or video data received from said devices, the correlation engine 230 may compare the client fingerprint to a plurality of measurement fingerprints generated from media from a corresponding plurality of broadcast sources or channels at the same timestamp. In a further implementation, to allow for differences between timestamps, the correlation engine 230 may compare the client fingerprint to a plurality of measurement fingerprints in a sliding window around the client timestamp, such as within a ten minute range of the client timestamp. Matches need not be exact in many implementations, due to differences in levels, extraneous noise, imprecise or uncorrelated start times, etc., but may be considered to be matching if the two fingerprints correspond above a threshold. In other implementations, a client timestamp may not be required; rather, the correlation engine 230 may compare the received client fingerprint to measurement fingerprints over a prior period, such as a five minute period. This is based on an assumption that the delay between the client device capturing a segment of audio or video, generating a fingerprint, and transmitting the fingerprint to the measurement system will likely be significantly less than this period. Correlation engine 230 may use any type of analysis to compare fingerprints, including PCA, LDA, or any other such statistical analysis methods. In some implementations, correlation engine 230 may generate confidence scores for the match of the client fingerprint to each measurement fingerprint, and identify as matching a measurement fingerprint with a highest confidence score. In a further implementation, correlation engine 230 may adjust confidence scores based on historical data for the client device (e.g. increasing confidence scores for fingerprints from frequently watched broadcast sources or channels; increasing confidence scores for a broadcast channel responsive to detecting a match from the same broadcast channel during an immediately prior time period; etc.).

Measurement/feedback system 108 may also include a feedback engine 232. Feedback engine 232 may be an application, server, service, daemon, routine, or other executable logic for receiving and processing identifications of feedback, queries, commands, or other interactions from audience members. A feedback engine 232 may receive, over a network 106, feedback or interactions recorded by a client device 100 or capture device 205 via a microphone and/or camera or input via an input device of the client device 100 or capture device 205. Feedback may be transmitted in a raw recorded state (e.g. an audio or video file), or may be identified by the client device or capture device and transmitted as an identifier. In one such implementation, a client device 100 may record applause via a microphone and identify the applause via its characteristic short bursts of noise matching a predetermined signature. The client device 100 may then transmit a code identifying applause to the feedback engine 232. In another implementation, the client device 100 may measure characteristics of the feedback (e.g. volume of cheers or boos) and may transmit the measurements to the feedback engine 232.

Feedback may also include commands or queries, which may be identified by a speech-to-text engine executed by the client device 100, capture device 205, feedback engine 232, or another system in communication with the measurement/feedback system 108. Upon receiving a query for information about broadcast content (e.g. a request for a name of a song, actor biography, product information website, transcript of content, etc.), feedback engine 232 may determine whether media output by multimedia system 102 has been identified by a correlation engine 230. If not, the feedback engine 232 may request the client device or a capture device in the client location 200 to provide an identification of content or a fingerprint or segment of recorded content from multimedia system 102 to the correlation engine 230, which may identify the corresponding broadcast source and time as discussed above. The feedback engine 232 may then retrieve data from caption logs 220 and/or entity database 228 to identify entities or text corresponding to the request. In some implementations, feedback engine 232 may transmit an identification of the entities or text to the client device 100, while in other implementations, feedback engine 232 may direct a search provider to retrieve and provide corresponding data to client device 100 (e.g. a search for a biography of an identified actor on screen during a segment, responsive to identification of the segment, identification of the query, and identification of the entity corresponding to the segment and query). In a similar implementation, upon receiving a command or identification of a command from the client device 100 (e.g. "share this content with my friend Joe"), the feedback engine 232 may transmit a corresponding request to a social networking service based on the content identified by correlation engine 230.

Figure 2B:
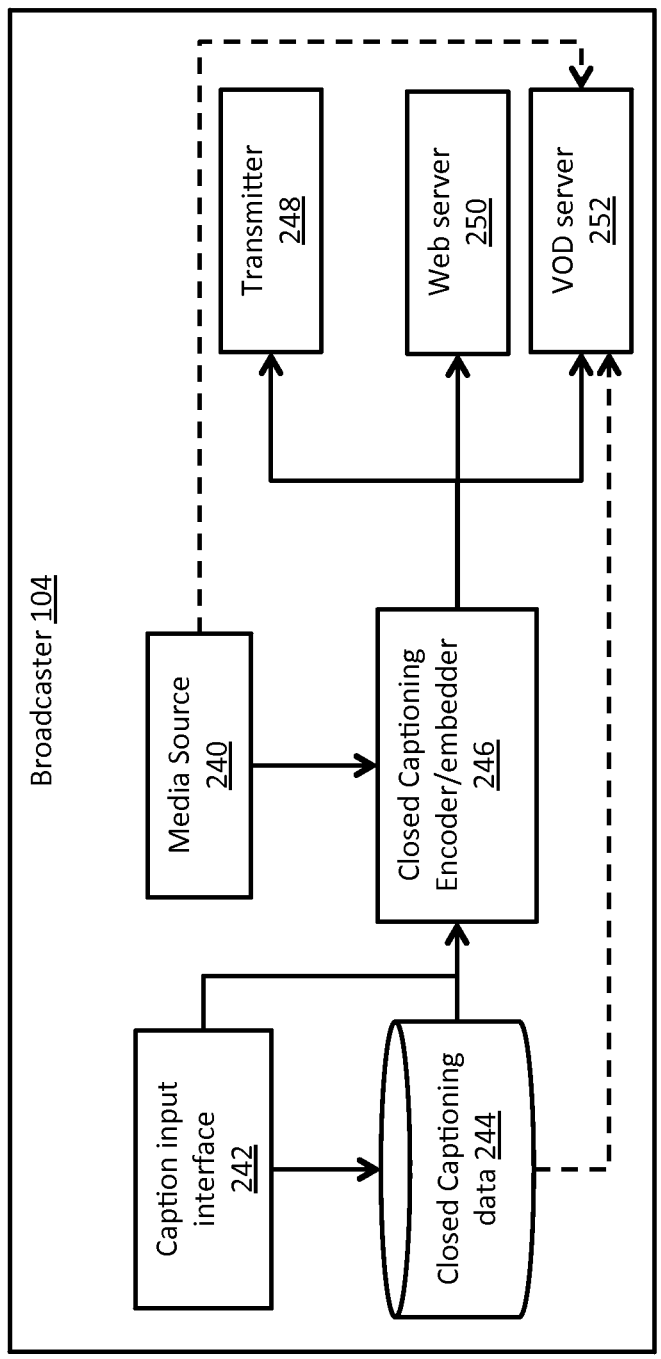
FIG. 2B is a block diagram of a broadcast provider system, according to one implementation.

FIG. 2B is a block diagram of a broadcast provider system, according to one implementation. As shown, a broadcaster 104 may include one or more media sources 240. Although only one media source is illustrated, it may be readily appreciated that typical broadcasters 104 may include multiple studios, media play out sources, satellite downlinks, or other equipment, which may be mixed or selected via a mixer, router, switch, or other interface and provided to a closed captioning encoder or embedder 246, referred to generally as an encoder 246. Media source 240 may also include metadata, or metadata may be added to or embedded in a signal from a media source 240 or by encoder 246.

As discussed above, encoders 246 may receive closed captioning data from one or more sources, such as a caption input interface 242 and/or a closed captioning data file 244, and may encode or embed the data in EIA-608 and/or EIA-708 format or other similar formats. Closed captioning may be inserted for live programming, such as live sports or news broadcast events via input interfaces 242 (e.g. computing devices, keyboards, text-to-speech converters, etc.); or may be provided by program producers or third-party services for pre-recorded content, such as movies or television programs. Closed captioning data files 244 may be sent to an encoder 246 via automation or other systems for synchronized embedding during playback for on-air broadcasting.

In some implementations, output of an encoder 246 may be provided to a transmitter 248, such as a satellite transmitter, terrestrial transmitter, microwave transmitter, or cable modulator; may be provided to a web server 250 for streamed broadcasting; and/or may be provided to a VOD server 252 for transfer to a client responsive to a request. In some implementations, media content from a source 240 and closed captioning data 242 may be provided separately to a VOD server 252, without embedding, or for embedding via a client-side interface.

Figure 3A:
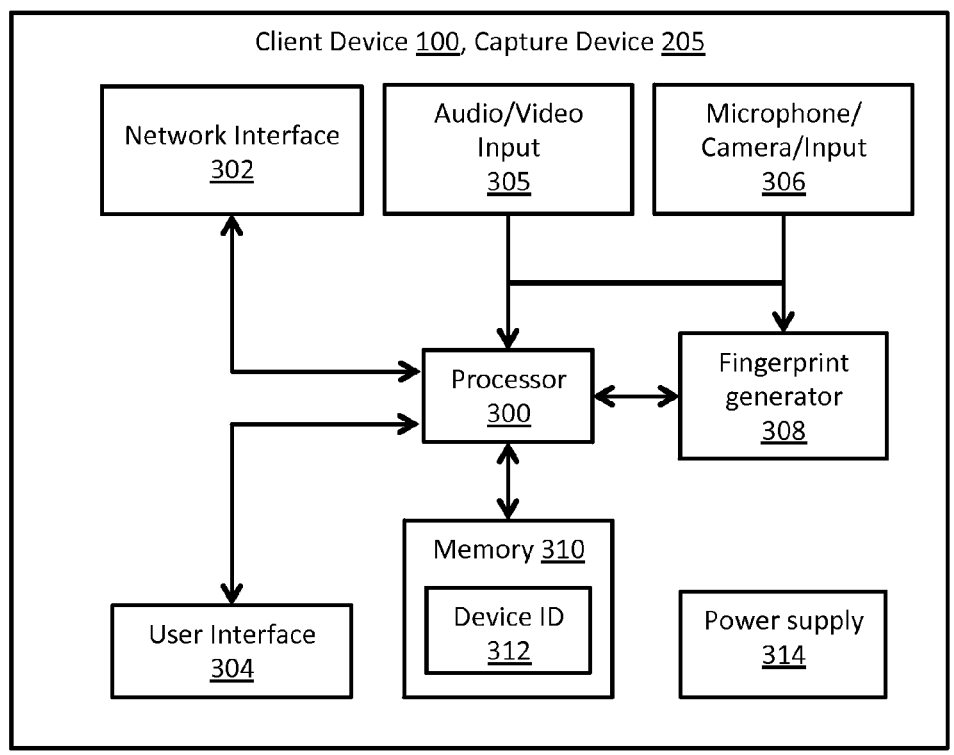
FIG. 3A is a block diagram of a client device or capture device, according to one implementation.

FIG. 3A is a block diagram of a device, such as a client device 100 or a capture device 205, according to one implementation. As discussed above, a client device 100 may be a portable computing device, laptop computing device, wearable computing device, smart phone, tablet, desktop computer, or any other type and form of device. Similarly, capture device 205 may be a desktop computer, game console, set top box, smart television, smart multimedia receiver, or other type and form of device. In many implementations, a client device 100 may be portable and carried by an audience member, while a capture device 205 is installed in proximity to a media device, such as a television or radio.

In many implementations, a device 100, 205 may include a processor 300. Processor 300 may comprise any type and form of processing unit, including a microprocessor, application-specific integrated circuit (ASIC), FPGA, etc., or combinations of these or other processing units. In many implementations, processor 300 may be a multi-core processor or an array of processors. A device 100, 205 may also include memory 310, which may include, but is not limited to, electronic, optical, magnetic, or any other storage devices capable of providing processor 300 with program instructions. Memory 310 may include a floppy disk, CD-ROM, DVD, magnetic disk, memory chip, ROM, RAM, EEPROM, EPROM, flash memory, optical media, or any other suitable memory from which processor 300 can read instructions and, in some implementations, to which processor 300 can write recorded audio or video segments, metadata, closed captioning data, audio or video fingerprints, or other such data for transmission via network interface 302. The instructions may include code from any suitable computer programming language such as, but not limited to, C, C++, C#, Java, JavaScript, Perl, HTML, XML, Python and Visual Basic.

In some implementations, device 100, 205 may include a network interface 302 for transmitting data to a feedback/measurement system and/or entity database 228 or caption log 220. A network interface 302 may comprise any type and form of network interface, including a wired interface (e.g. Ethernet, including 10 Base T, 100 Base T, or 1000 Base T ("Gigabit")), a wireless interface (e.g. 802.11a, 802.11b, 802.11g, 802.11n, 802.11.ac, Bluetooth, Bluetooth Low Energy, Near-field Communication (NFC)), a cellular interface, or any other type of interface for transmitting data over a network. In some implementations, network interface 302 may comprise a parallel or serial interface, such as a USB interface, an IEEE 1394 (Firewire) interface, an RS-232 interface, an RS-485 interface, or any other type and form of interface to another computing device. In many implementations, a second computing device may serve as an intermediary for communications to a measurement/feedback system. In one such implementation, a capture device may communicate via a USB interface with a desktop computer, which may transmit captured closed captioning data via an Ethernet interface to a network gateway or switch connected to the Internet for transmission to a measurement/feedback system. In such implementations, network interface 302 may be referred to as a communications interface. In some implementations, the device 100, 205 may store decoded and/or hashed data in a memory 310, for subsequent synchronization or transfer via a computing device connected to a network 106.

In some implementations, a device 100, 205 may include an audio and/or video input 305. Input 305 may be any type and form of audio or video input, including an analog composite or component video input, a baseband or RF video input, a digital video input, or any other type of input. In some implementations, a capture device 205 may include a video splitter and a video output (not illustrated) allowing pass through of audio or video signals. In one such implementation, the capture device 205 may be deployed as an intermediary device between a video output of a receiver and a video input of a television or other display or between a receiver and a fingerprint generator 214 of a measurement system. Accordingly, the capture device 205 may include a video input 305 for connection to the receiver, a video splitter for splitting the input signal for processing by a closed captioning decoder 218, or detector 222-226, and a video output for connection other devices.

In many implementations, a client device 100 may not include an audio/video input 305, or may not utilize an input 305 for practicing the methods discussed herein, but may instead use an input device, such as a microphone, camera, or other interface 306 for recording interactions or feedback from an audience member, as well as media content. Similarly, in many implementations, a capture device 205 installed at a client location may include a camera, microphone, or other input device 306 for recording such interactions or feedback, allowing interactive operation without requiring a client device 100.

The output of an audio/video input 305 and/or microphone, camera, or other input 306 may be provided to a processor 300 for transmission via network interface 302, or, in some implementations, may be provided to a fingerprint generator 308. Fingerprint generator 308, similar to fingerprint generator 214, may comprise hardware, software, or a combination of hardware and software. In one implementation, generator 308 may comprise a CMOS integrated circuit (IC), such as a MC144144 series IC manufactured by Motorola Inc. of Schaumburg, Ill. or an equivalent IC; a programmable IC or field-programmable gate array (FPGA); or any other type and form of circuit or combination of circuits. In another implementation, the device 100, 205 may include a software fingerprint generator executed by a processor 300, which may read a digital input or output of an analog-to-digital converter connected to inputs 305 or 306.

Generator 308 may generate audio and/or video fingerprints of input signals or data segments by sampling audio and/or video data of the signal and calculating a hash of the resulting audio and/or video data, by decimating the audio and/or video data (e.g. by removing nine out of ten samples) and hashing the decimated data, by calculating a convolution of the audio data against the video data, or otherwise creating a unique identifier for a recorded segment of data.

In some implementations, a device 100, 205 may include a device identifier 312. Device identifier 312 may be an alphanumeric string, data string, serial number, MAC address, IP address, username or account name, GUID, cookie, random or pseudorandom number, or any other type and form of identifier, including combinations of these or other identifiers, to identify the device 100, 205. In some implementations, the device identifier 312 may be fixed to the device or preconfigured in the device, such as a manufacturer serial number or MAC address, while in other implementations, the device identifier 312 may be dynamically set by a panel provider, by the measurement system, or other entity, such as via a cookie or username. In some implementations, a unique or new device identifier 312 may be set for each communication to the measurement system, while in other implementations, the device identifier 312 may not be changed, or may be changed periodically (e.g. hourly, daily, weekly, etc.) or at other intervals (e.g. on restart of the capture device, login to an internet service, etc.). Device identifier 312 may be transmitted to the measurement system before, with, or subsequent to a transfer of fingerprint data or recorded segments of media, audio, or video, such that the data may be identified as having been captured by the device 100, 205. In one embodiment, a device 100, 205 may log in or establish an authenticated session with a feedback/measurement system using the device identifier 312. In another embodiment, the device 100, 205 may transmit recorded data or fingerprints in the body of a packet, with the device identifier included in the header of the packet. Recorded or fingerprint data may be transmitted via a RESTful protocol, HTTP request (e.g. a POST or GET request with captioning data as a parameter-value pair), or via any other such application, session, or presentation layer protocol. In other implementations, recorded data or fingerprints may be transmitted via an options field of a transport layer protocol packet header, such as a TCP or UDP packet. In other implementations, recorded data or fingerprints may be provided as a serial bit stream.

In some implementations, a device 100, 205 may include a power supply 314. Power supply 314 may comprise a battery, AC power supply, DC power supply, USB power supply, Power-over-Ethernet (PoE) power supply, inductive power supply, or any other type and form of power supply. Although illustrated internal to a device 100, 205, in many implementations, a power supply 314 may be external from device 100, 205, such as an external AC-to-DC converter.

Figure 3B:
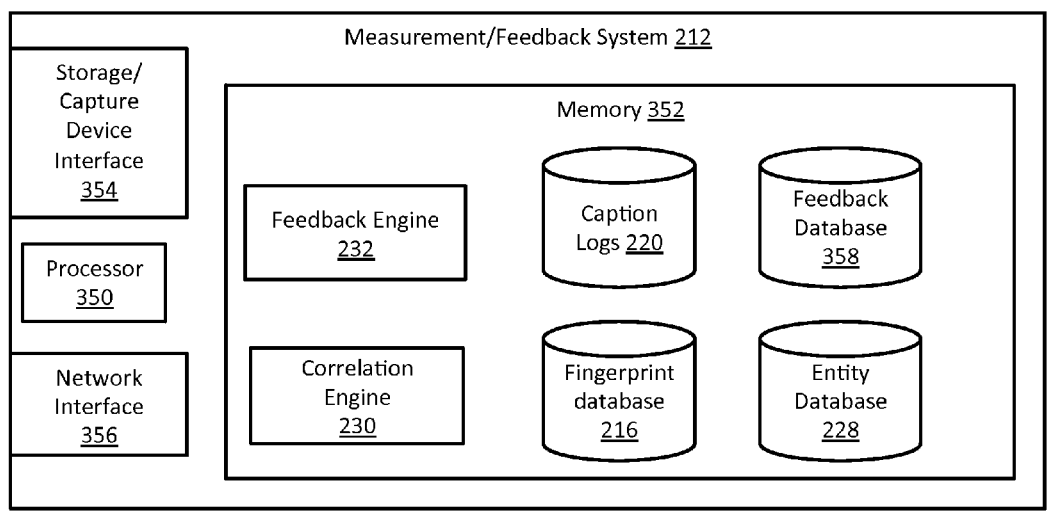
FIG. 3B is a block diagram of a measurement/feedback server, according to one implementation.

FIG. 3B is a block diagram of a measurement/feedback system, according to one implementation. In many implementations as discussed above, a measurement/feedback system 212 may comprise a plurality of devices connected via a network, such as a server farm or cluster or a cloud of devices. In other implementations, one or more measurement/feedback systems 212 may comprise a virtual machine executed by a physical machine. Accordingly, in such implementations, a measurement/feedback system may comprise one or more of each of interfaces, memory, and processors 350-356.

A measurement/feedback system 212 may include one or more processors 350, similar to a processor 300. Processor 350 may comprise any type and form of processing unit, including a microprocessor, application-specific integrated circuit (ASIC), FPGA, etc., or combinations of these or other processing units. In many implementations, processor 350 may be a multi-core processor or an array of processors. Measurement/feedback system 212 may also include memory 352 similar to memory 310, which may include, but is not limited to, electronic, optical, magnetic, or any other storage devices capable of providing processor 350 with program instructions. Memory 352 may include a floppy disk, CD-ROM, DVD, magnetic disk, memory chip, ROM, RAM, EEPROM, EPROM, flash memory, optical media, or any other suitable memory from which processor 310 can read instructions and, in some implementations, to which processor 310 can write recorded audio or video segments, metadata, closed captioning data, audio or video fingerprints, or other such data. The instructions may include code from any suitable computer programming language such as, but not limited to, C, C++, C#, Java, JavaScript, Perl, HTML, XML, Python and Visual Basic.

Measurement/feedback system 212 may include one or more storage device or capture device interfaces 354, and one or more network interfaces 356. As discussed above, in many implementations, a client device 100 or capture device 205 may communicate with a measurement/feedback system 212 via a network 106 to a network interface 356. Network interface 356 may comprise any type and form of network interface, such as a wired interface (e.g. Ethernet), a wireless interface (e.g. 802.11a, 802.11b, 802.11g, 802.11n, 802.11.ac, Bluetooth, Bluetooth Low Energy, NFC interface, etc.), a cellular interface, or any other type of interface for receiving data from devices 100, 205. Network interface 356 may also be used for communicating with a search service, social networking service, content provider, broadcaster, or any other such devices or services. In some implementations, network interface 356 may also be used for providing music or facial recognition data to a music matching service or facial recognition database service and for receiving identifications of matching entities.

In many implementations, as discussed above, a measurement/feedback system 212 may be deployed locally to a fingerprint generator 214, CC capture device 218, or detector 222-226. In such implementations, the generators or detectors may connect via a network interface 356, or via a capture device interface 354, including a parallel or serial interface, such as a USB interface, an IEEE 1394 (Firewire) interface, an RS-232 interface, an RS-485 interface, or any other type and form of interface. In many implementations, a measurement/feedback system 212 may connect to one or more storage devices, such as hard drives, flash drives, redundant arrays of independent disks (RAID arrays), network attached storage (NAS) devices, storage area network (SAN) devices, or any other type and form of storage. Such storage devices may store closed captioning data 220, as discussed above, received from one or more broadcasters 208, or one or more audience measurement capture devices 220; an entity database 234; a fingerprint database 216; or any other such data. In some implementations, feedback or interactions received from client devices 100 or capture devices 205 may be logged or stored in a feedback database 358, which may be analyzed and/or provided to broadcasters or content providers.

Memory 352 may include a correlation engine 230. As discussed above, correlation engine 230 may comprise an application, service, server, daemon, routine, subroutine, or other executable logic for comparing and correlating fingerprints, watermarks, metadata, timestamps, received audio or video, or any other such data from a client device 100 or capture device 205, with fingerprints, watermarks, metadata, timestamps, received audio or video, or any other such data from a fingerprint generator 214, CC capture device 218, or detector 226, said latter data associated with a broadcast source and time.

Memory 352 may also include a feedback engine 232. As discussed above, feedback engine 232 may be an application, server, service, daemon, routine, or other executable logic for receiving and processing identifications of feedback, queries, commands, or other interactions from audience members. A feedback engine 232 may receive, over a network 106, feedback or interactions recorded by a client device 100 or capture device 205 via a microphone and/or camera or input via an input device of the client device 100 or capture device 205.

Figure 4A:
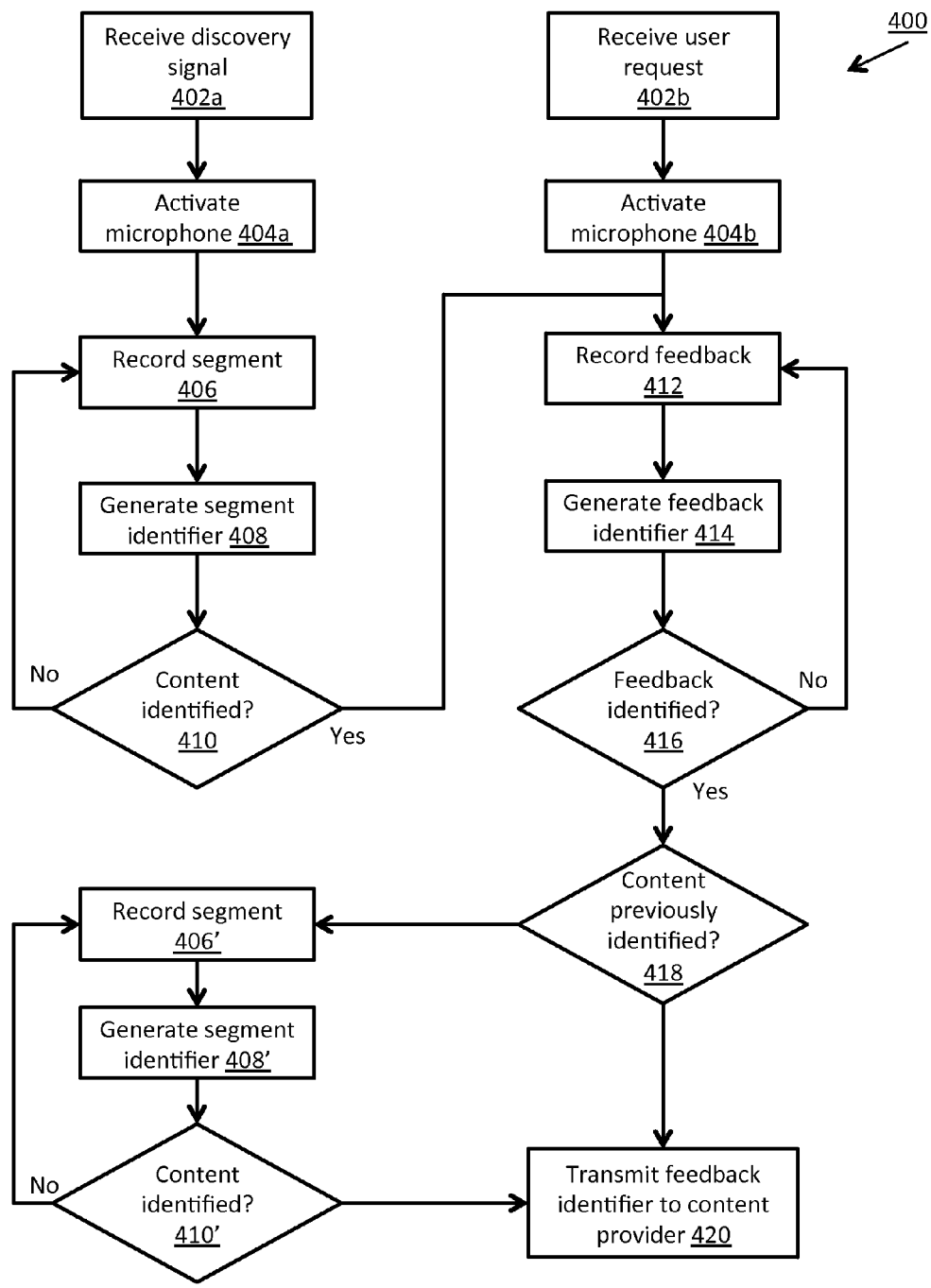
FIG. 4A is a flow diagram of the steps taken in one implementation of a process for broadcast audience interaction and participation, according to one implementation.

FIG. 4A is a flow diagram of the steps taken in one implementation of a process 400 for broadcast audience interaction and participation, according to one implementation. Audience members or users may consent to participation in the feedback system, either via a one-time enrollment or sign up process, or through periodic log ins or similar methods. Audio or other information may be obtained from user devices responsive to the user consenting to the collection or feedback system. In some implementations, users may be panel members, such as users that have joined a single source measurement panel or audience measurement panel. Audio capture may also be temporarily paused or permanently disabled by the user, or the user may withdraw consent or cease participating in the feedback system at any time. Audio capture or information about the audio may also be anonymized or made ambiguous, stripped or cleaned of any personally identifying information, and/or encrypted for transmission.

At step 402a, a client device may receive a discovery signal or trigger signal broadcast from a capture device or other device associated with a media device. As discussed above, the discovery signal may be broadcast continuously or periodically, via WiFi, NFC, Bluetooth, or any other similar short range wireless communication protocol, or may be broadcast via a LAN to a client location. In some implementations, the signal may be broadcast during presentation of media on a media device (e.g. while the media device is turned on). In other implementations, the client device may broadcast a presence signal and the capture device or device associated with the media device may respond with the discovery signal, responsive to receiving the presence signal.

Upon and responsive to receiving the discovery signal, at step 404a, the client device may active a microphone, camera, or other input device of the client device. In some implementations, the microphone, camera, or other input device may be activated for a predetermined period of time until expiration of a timer. The timer may be reset responsive to receipt of the broadcast discovery signal, which may be rebroadcast while the media device is displaying or playing content. Accordingly, once the media device is off or the client device is out of range, the timer may expire and the microphone, camera, or other input may be deactivated.

At step 406, the client device may record a segment of media output by the media device. The recorded segment may be of predetermined length, such as 10 seconds, 30 seconds, or any other length. The recorded segment may be provided to a fingerprint generator for processing or network interface for transmission to a measurement service while a subsequent segment is being recorded. Accordingly, in some implementations, the client device may record media to a buffer, such as a ring buffer, while reading from the buffer at another position.

At step 408, a fingerprint generator of the client device or, in implementations in which the raw recorded segment is provided to a measurement service, the measurement service may generate a fingerprint or identifier for the segment. As discussed above, generating the fingerprint may include sampling audio and/or video data of the segment and calculating a hash of the resulting audio and/or video data, by decimating the audio and/or video data (e.g. by removing nine out of ten samples) and hashing the decimated data, by calculating a convolution of the audio data against the video data, or otherwise creating a unique identifier for an item of content. In implementations in which a fingerprint generator of the client device generates the fingerprint, said fingerprint may be provided to a measurement service.

At step 410, the measurement service may compare the generated or received fingerprint to a database of fingerprints generated by a fingerprint generator of the measurement service on data received from broadcasters and/or content providers. As discussed above, the comparison may be performed on fingerprints generated within a predetermined period of time of the client fingerprint, such as the prior 5 or 10 minutes, across a plurality of broadcast or content sources. A match may be identified via any type and form of statistical analysis, and identification may include generating a confidence score for a match, filtering confidence scores based on a threshold, and/or adjusting confidence scores based on historical a priori knowledge of likely broadcast sources or content. If no matching fingerprint is identified, then steps 406-410 may be repeated. If a matching fingerprint is identified, then in some implementations, the measurement system may identify the content and/or broadcast source corresponding to the matching fingerprint and identify the client device as being in the audience of display of the content.

As discussed above, client devices may be automatically discovered and have recording capabilities activated when in range of a media device. In other implementations, a user of the client device may manually activate a recording or feedback or interaction mode at step 402b, such as via launch of an application, activating a user interface element, performing a gesture, speaking a command word, etc. Responsive to the user activation, at step 404b, the microphone, camera, or other input device may be activated, as discussed above. In some implementations, a timer may be activated responsive to the user request, and upon expiration of the timer, the microphone, camera, or other input may be deactivated.

In some implementations, at step 412, the client device may record feedback or an interaction by an audience member. As discussed above, recording feedback or an interaction may include recording cheers, applause, boos, singing, commentary, questions, or commands. In some implementations, the recorded feedback or interaction may be provided to a feedback engine of a measurement service via a network interface of the client device. At step 414, the client device, or a feedback engine of a measurement/feedback service, may identify the feedback based on comparison to a signature, or may generate a fingerprint for the feedback as discussed above. In implementations in which the client device identifies the feedback or generates a fingerprint, the identifier or fingerprint may be provided to a feedback engine. If feedback is not identified, then steps 412-416 may be repeated.

In many implementations, audio or video of the media content may be received or recorded by the client device while recording the user feedback, and the measurement/feedback system may be required to distinguish the user feedback from the media content. In one implementation, user queries or commands may be preceded by a command word or phrase, such that detection of the command word or phrase indicates that the following speech is a request or command of the user. In another implementation, user queries or commands may be at a higher volume than media content, as the user is closer to the portable device than the media device. In still another implementation, if a first segment of content is identified as matching a segment of media content with a high confidence, a subsequent second segment of content is identified as matching the segment of media content with a lower confidence level, and a subsequent third segment of content is identified as matching the segment of media content with a high confidence level, the middle segment may be inferred as including feedback, which may be further identified or compared to feedback signatures.

In still other implementations, a client device and capture device may both record segments of media content output by a media device simultaneously. The capture device may record the segments via a direct or wired connection to the media device or a receiver, while the client device uses a microphone. Partial or total correlation between the two recorded segments or fingerprints of the segments may indicate that the portable device is present during the broadcast. During segments with lower correlation, signals recorded by the capture device may be subtracted from signals recorded by the client device to isolate user feedback provided during the segment.

As shown, in some implementations, responsive to automatic activation responsive to a discovery signal, the system may first generate an identifier of an item of content and then generate an identified of user feedback or interaction. In other implementations, the user feedback or interaction may be identified first, particularly if the feedback is received shortly after activation of the input of the client device. Accordingly, at step 418, the client device may determine whether an identifier of media content has been identified. If not, then steps 406' to 410', similar to steps 406-410, may be repeated.

At step 420, responsive to identifying a playing item of content and an item of feedback or interaction, in some implementations, an identifier of the feedback or interaction may be provided to the broadcaster or content provider that generated or provided the item of content. In other implementations, as discussed above, queries or commands for a search provider or social network service may be generated based on the identified item of content and the identified feedback, and in some implementations, one or more entities associated with the item of content.

Figure 4B:
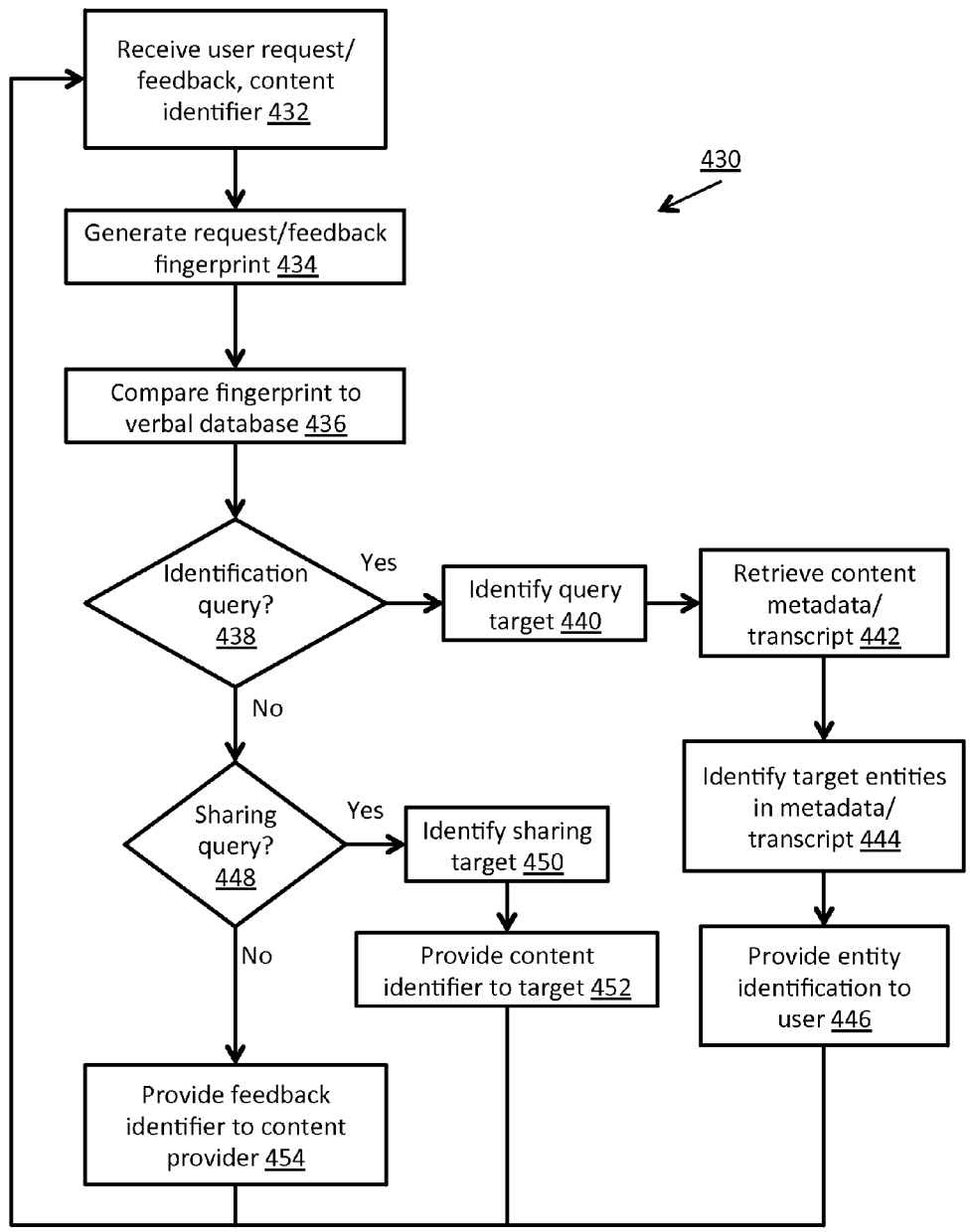
FIG. 4B is a flow diagram of the steps taken in another implementation of a process for broadcast audience interaction and participation, according to one implementation.

FIG. 4B is a flow diagram of the steps taken in another implementation of a process 430 for broadcast audience interaction and participation, according to one implementation. At step 432, a feedback engine of a measurement/feedback system may receive a user request or command or feedback via a network from a client device or capture device at a client location. As discussed above, the request, command, or feedback may be provided as raw data, such as audio or video data. In such implementations, at step 434, the feedback engine may generate a fingerprint or signature of the request, command, or feedback. In other implementations, the feedback engine may receive the fingerprint or signature generated by the client device or capture device. As discussed above, At step 436, the feedback engine may compare the fingerprint or signature to a database of signatures or fingerprints to identify the type and content of the feedback, request, or command. Signatures may be pre-generated as a result of user-specific training or general population training, and may include signatures for applause, signatures for cheering, and signatures for booing, as well as signatures for various spoken words and/or phonemes. Speech-to-text systems may be used to detect spoken commands or requests and generate corresponding text for creating search queries or commands to social networking or media services.

At step 438, the feedback engine may determine if the user feedback matches a signature of an identification query or request to identify a person, song, product, program, album, or other entity in the media content. If so, at step 440, the feedback engine may identify a query target, such as the entity identified in the request. The feedback engine may identify the target entity via the speech-to-text output as discussed above. At step 442, the feedback engine may retrieve an identification of an entity from an entity database and/or closed captioning transcript corresponding to the identified media content output by the media device during (or slightly before or after) the recordation of the user query by the client device. As discussed above, the entity database may include one or more entities (e.g. actors, songs, artists, producers, etc.) associated with an item of media content. Each entity may be identified by a corresponding type identifier, such that if a user requests to know the song playing during an item of media content, the feedback engine may use the identification of the media content to retrieve the corresponding song entity identifier from the entity database, and generate a response for the user. Accordingly, in such implementations, at step 444, the feedback engine may retrieve an identifier of the target entity from the entity database and/or transcript; and at step 446 may respond to the client request with the retrieved identification.

At step 448, in a similar implementation, the feedback engine may identify if the feedback is a sharing request or command (e.g. "share this program with my friend"). The feedback engine may perform the identification using similar signatures or speech-to-text engines as discussed above. In a further implementation, the feedback engine may receive, from the client device, an identifier of a target recipient for the content to be shared with. In another implementation, the feedback engine may transmit a request to the client device to identify a sharing target, such as a friend on a social networking service. At step 450, the feedback engine may identify the target recipient from the query or from a response to the request, and at step 452, may transmit a sharing request or command to a social network or social media service identifying the sharing target and the identified media content. In a further implementation, steps 438-446 and 448-452 may be combined for complex queries (e.g. "share the song that's currently playing with Joe"). In many implementations, steps 448-452 may be performed before steps 438-446. In other implementations, similar queries and commands may be identified and functions performed, such as adding an identification of a currently playing song to a download or purchase list; subscribing to a program; ordering a product visible in a scene during a program; requesting the score of a currently playing sporting match; or any other such complex functions, based on the automatic identification of the media content received at the client device and the user-requested entity and query. In some implementations, as discussed above, searches may be generated based on the content and/or identified entity and provided to a search provider, with the result transmitted or forwarded to the client device, allowing direct and intuitive access to further knowledge about an entity.

At step 454, if the feedback is not a query or command, in some implementations, the feedback or an identifier of the feedback may be provided to a broadcaster or content provider. In one such implementations, cheers or boos or identifiers of such responses may be provided and/or aggregated with similar responses of other audience members and provided, in real-time or delayed, to a content provider. This may allow for measurement of audience responses or engagement with a program, as well as providing remote audience interaction, voting, or surveying. Keywords in spoken feedback may be identified and provided to the content provider or aggregated to indicate positive or negative impressions by the audience.

In a further implementation, viewer engagement may be encouraged through gamification features, such as providing prizes or achievement awards for performing various tasks during a program. In one such implementation, an item of content may include an instruction to viewers to cheer or sing along, with said feedback automatically recorded by the client device and provided to the content provider. In some implementations, viewer feedback may be added to the broadcast, such as mixing remote viewer applause or cheers with live audio of a performance, to further increase feelings of engagement and participation. In other implementations, questions or opinions of audience members may be recorded and automatically provided to a content provider, without requiring any additional steps by the audience member. This may allow remote viewers to participate in questioning candidates during a debate, or receive answers to questions from an instructor during an educational program, without needing to navigate complex menu systems or remember codes or numbers.

Closed captioning databases, entity databases, fingerprint databases, and feedback databases or arrays may be periodically purged. Device identifiers and confidence scores may be removed from a database after a program is complete and a measurement is generated. In other implementations, the device identifiers and confidence scores may be removed from the database after an hour, a day, a week, or any other amount of time. This may allow for aggregation of feedback including live audiences as well as audience members who record and time-shift the program for later watching. Closed captioning databases, entity databases, and fingerprint databases may also be purged with entries removed after a predetermined amount of time, such as prior to a next episode of a program, or simply periodically.

In some implementations, users initiating queries may be provided with an opportunity to control whether or how to transmit feedback or interaction data to the measurement/feedback system. Thus, the user may have control over how information is collected about him or her and used by the measurement/feedback system and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a readonly memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magnetooptical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:
1. A system for broadcast audience interaction comprising:
    a first receiver at a measurement location, configured to receive an item of media;
    a fingerprint generator, configured to generate a first fingerprint from the received item of media;

a correlation engine executed a processor of a device, the correlation engine configured to receive a second fingerprint generated from a segment of the item of media recorded from a media output device by a client device at a client location, determine that a correlation between the first fingerprint and the second fingerprint exceeds a correlation between the second fingerprint and any other fingerprints of a plurality of fingerprints, and identify a match between the first fingerprint and the second fingerprint responsive to the determination that the correlation between the first fingerprint and the second fingerprint exceeds the correlation between the second fingerprint and any other fingerprints of the plurality of fingerprints; and a feedback engine executed by the processor, configured to receive a recording of feedback of an audience member by the client device, and associate the feedback with the item of media responsive to the identified match between the first fingerprint and the second fingerprint.

2. The system of claim 1, wherein the feedback engine is further configured to associate the feedback with an entity associated with the item of media in an entity database.

3. The system of claim 1, further comprising an entity detector configured to generate an association of the entity with the item of media responsive to detection of the entity in the segment of the received item of media.

4. The system of claim 1, wherein the feedback engine is further configured to transmit a query to a search provider comprising an identification of an entity associated with the item of media and an identification of the feedback.

5. The system of claim 1, wherein the feedback engine is further configured to transmit a query to a search provider comprising a device identifier of the client device.

6. The system of claim 1, wherein the feedback engine is further configured to transmit a query to a search provider comprising an identification of an entity associated with the item of media, an identification of the feedback, and a device identifier of the client device, receipt of the query by the search provider causes the search provider to transmit a response to the client device comprising the identification of the entity associated with the item of media.

7. The system of claim 1, wherein the feedback engine is further configured to determine, responsive to a comparison of the recording of feedback to one or more predetermined feedback signatures, whether the feedback is positive or negative; and to transmit a corresponding positive or negative feedback indicator to a content provider.

8. A system for broadcast audience interaction comprising:
a first receiver at a measurement location, configured to receive an item of media;
a fingerprint generator, configured to generate a first fingerprint from the received item of media;
a correlation engine executed a processor of a device, the correlation engine configured to:
receive a second fingerprint generated from a segment of the item of media recorded from a media output device by a client device at a client location,
generate a confidence score of a correlation between the first fingerprint and the second fingerprint, and
increase the confidence score, responsive to an identification of a correlation between a third fingerprint generated by the fingerprint generator from the received item of media prior or subsequent to the first fingerprint, and a fourth fingerprint generated from a corresponding prior or subsequent segment of the item of media recorded from the media output device by the client device, and
identify a match between the first fingerprint and the second fingerprint based on the confidence score of the correlation between the first fingerprint and the second fingerprint; and a feedback engine executed by the processor, configured to receive a recording of feedback of an audience member by the client device, and associate the feedback with the item of media responsive to the identified match between the first fingerprint and the second fingerprint.

9. The system of claim 8, wherein the feedback engine is further configured to associate the feedback with an entity associated with the item of media in an entity database.

10. The system of claim 8, further comprising an entity detector configured to generate an association of the entity with the item of media responsive to detection of the entity in the segment of the received item of media.

11. The system of claim 8, wherein the feedback engine is further configured to transmit a query to a search provider comprising an identification of an entity associated with the item of media and an identification of the feedback.

12. The system of claim 8, wherein the feedback engine is further configured to transmit a query to a search provider comprising an identification of an entity associated with the item of media, an identification of the feedback, and a device identifier of the client device, receipt of the query by the search provider causes the search provider to transmit a response to the client device comprising an identification of an entity associated with the item of media.

13. The system of claim 8, wherein the feedback engine is further configured to determine, responsive to a comparison of the recording of feedback to one or more predetermined feedback signatures, whether the feedback is positive or negative; and to transmit a corresponding positive or negative feedback indicator to a content provider.

14. A method of broadcast audience interaction, comprising:
receiving, by a first receiver executing on a measurement system having one or more processors, an item of media at a measurement location;
generating, by fingerprint generator executing on the measurement system, a first fingerprint from the received item of media;
receiving, by a correlation engine executing on the measurement system, a second fingerprint generated from a segment of the item of media recorded from a media output device by a client device at a client location;
determining, by the correlation engine, that a correlation between the first fingerprint and the second fingerprint is greater than a correlation between the second fingerprint and any other fingerprint of a plurality of fingerprints;
identifying, by the correlation engine, a match between the first fingerprint and the second fingerprint responsive to responsive to determining that the correlation between the first fingerprint and the second fingerprint exceeds the correlation between the second fingerprint and any other fingerprints of the plurality of fingerprints; and
receiving, by a feedback engine executing on the measurement system, a recording of feedback of an audience member by the client device; and
associating, by the feedback engine, the feedback with the item of media, responsive to identifying the match between the first fingerprint and the second fingerprint.

15. The method of claim 14, further comprising:
identifying, by an optical character recognition detector executing on the measurement system, text of the item of media; and
associating, by an entity detector executing on the measurement system, an entity in an entity database with the item of media based on the detected text.

16. The method of claim 14, further comprising:
identifying, by a music detector executing on the measurement system, a song from an audio segment of the item of media; and
identifying, by an entity detector executing on the measurement system, from an entity database, an entity in an entity database to associate with the item of media based on the detected song.

17. The method of claim 14, further comprising:
identifying, by an image feature detector executing on the measurement system, an image feature from an image or a frame of the item of media; and
identifying, by an entity detector executing on the measurement system, from an entity database, an entity in an entity database to associate with the item of media based on the detected image feature.

18. The method of claim 14, further comprising generating, by an entity detector executing on the measurement system, an association of an entity with the item of media responsive to detection of the entity in the segment of the received item of media.

19. The method of claim 14, further comprising transmitting, by the feedback engine, a query to a search provider comprising an identification of an entity associated with the item of media, an identification of the feedback, and a device identifier of the client device, receipt of the query by the search provider causes the search provider to transmit a response to the client device comprising an identification of an entity associated with the item of media.

20. The method of claim 14, further comprising:
determining, by the feedback engine, responsive to a comparison of the recording of feedback to one or more predetermined feedback signatures, whether the feedback is positive or negative; and
transmitting, by the feedback engine, a corresponding positive or negative feedback indicator to a content provider.

* * * * *